(12) United States Patent
Tyrer

(10) Patent No.: US 6,601,745 B2
(45) Date of Patent: Aug. 5, 2003

(54) GOLF CART COOLER

(76) Inventor: Stephen Edward Tyrer, 147 Taft Crescent, Centerport, NY (US) 11721

( * ) Notice: Subject to any disclaimer, the term of this patent is extended or adjusted under 35 U.S.C. 154(b) by 35 days.

(21) Appl. No.: 09/892,598

(22) Filed: Jun. 27, 2001

(65) Prior Publication Data
US 2003/0000983 A1 Jan. 2, 2003

(51) Int. Cl.[7] .................................................. B60R 9/06
(52) U.S. Cl. ...................... 224/274; 62/457.2; 224/493; 224/318; 383/110
(58) Field of Search ................................. 224/274, 406, 224/407, 408, 409, 421, 493, 318; 383/110; 62/457.2

(56) References Cited

U.S. PATENT DOCUMENTS

| | | | | |
|---|---|---|---|---|
| 3,031,121 A | * | 4/1962 | Chase | 220/902 |
| 3,955,730 A | * | 5/1976 | Montgomery | 224/418 |
| 4,056,219 A | * | 11/1977 | Hine, Jr. | 224/421 |
| 4,066,196 A | * | 1/1978 | Jackson et al. | 224/417 |
| 4,440,332 A | * | 4/1984 | Kullen | 224/421 |
| 4,537,313 A | * | 8/1985 | Workman | 206/545 |
| 4,638,933 A | * | 1/1987 | Boufford | 224/421 |
| D293,551 S | | 1/1988 | Cannon et al. | |
| 4,892,226 A | * | 1/1990 | Abtahi | 206/204 |
| 4,929,094 A | * | 5/1990 | Becker | 383/110 |
| 4,989,767 A | | 2/1991 | Buschbom | |
| 5,181,555 A | * | 1/1993 | Chruniak | 165/41 |
| 5,341,928 A | * | 8/1994 | Jones et al. | 190/102 |
| 5,354,131 A | * | 10/1994 | Mogil | 150/109 |
| 5,758,513 A | * | 6/1998 | Smith | 62/371 |
| 5,820,268 A | * | 10/1998 | Becker et al. | 220/592.2 |
| 5,848,734 A | * | 12/1998 | Melk | 222/175 |
| 6,067,813 A | * | 5/2000 | Smith | 62/371 |
| 6,394,325 B1 | * | 5/2002 | Taylor | 206/315.3 |

OTHER PUBLICATIONS

Sports Coolers Unlimited, Power Cart Sports Cooler http://www.sportscoolers.com/course_power_cart.htm.

* cited by examiner

Primary Examiner—Stephen P. Garbe
(74) Attorney, Agent, or Firm—Michael T. York

(57) ABSTRACT

A thermally insulated cooler adapted to attach to the front of a motorized golf cart. The cooler having a top wall, a bottom wall and a sidewall wherein the top, bottom and sidewalls are made of flexible, thermally insulating material. The cooler rests on the front face of the golf cart's body and provides a thermally insulated storage area for items. The cooler includes a connecting mechanism for detachably connecting at least one edge of the top wall to a corresponding edge of the sidewall to allow access to the storage area.

16 Claims, 9 Drawing Sheets

GOLF CART COOLER

FIELD OF THE INVENTION

This invention relates generally to the field of food and beverage coolers for motorized golf carts.

DESCRIPTION OF THE RELATED ART

Golf cart coolers in the past have been utilized to keep beverages and other perishable items cool and to provide a storage area for these items. Since golfing is a summer sport, players are often subjected to very hot weather conditions and they desire fluids and snacks to help maintain their strength during play. However, golf carts typically do not have any means for storing items in a thermally insulated environment.

An example of a cooler that was invented for a golf cart is U.S. Pat. No. 4,989,767 to Vernon D. Buschbom. This patent describes a cooler designed for a golf cart. The cooler is meant to be portable and attaches either to the inner front of the cart's body within the passenger compartment or the outer front face of the cart. It is described as a hard body cooler with a rigid mounting member for attaching to the cart's body. The top of the cooler is attached to the back sidewall of the cooler using a rigid hinge member and screws. The bottom of the cooler is fitted with a rubber cushion member to prevent damaging the cart. The cooler is affixed to the inside front of the passenger compartment, being secured into this position using a floor mounting plate. Alternatively, the cooler may be attached to the outside front face of the cart's body using either a rigid hook, screws or bolts.

There are several key disadvantages of the cooler described in U.S. Pat. No. 4,989,767 to Vernon D. Buschbom. Since the cooler is a hard body structure it is not easy to store or transport. The cooler cannot be rolled or folded up, therefore, it cannot be stored in a player's golf bag and also takes up a significant amount of room in a player's car. The cooler described in this patent is not convenient to store and transport. In addition, the cooler is described as having a rigid mounting hook system. This hook system is not flexible to hook onto any cart in the market. If the body of the cart does not lend itself to allow the hook to attach, the cooler cannot be attached without securing it to the golf cart using screws or bolts. Therefore, the cooler is not versatile to allow a player to connect it to any cart temporarily for a round of golf and then disconnect it and take it home.

Another example of a cooler used in a golf cart is the POWER CART SPORTS COOLER that is currently being sold in the United States by SPORTS COOLERS UNLIMITED. This cooler is designed to fit inside of the golf cart's sweater rack between the passenger seating compartment and the golf bag storage area. The cooler is made out of soft panel construction with a zipper sealing three edges of the top to the side panels. It is clear in the advertisement of this product that the cooler is specifically designed to be positioned within the sweater rack of the cart and that it has no means to allow it to be attached to the front of the cart.

There are several key disadvantages of the type of cooler described in the SPORTS COOLER UNLIMITED advertisement. The first disadvantage is that the cooler is only designed to be positioned within the sweater rack. Typically, this rack is utilized to store jackets, sweaters, club head covers, hats and other items. If a player uses this cooler, he or she loses the storage space provided by the sweater rack to store other items. It would also be difficult to access the cooler from outside of the cart when golf bags are stored in the golf bag storage department with the bags secured to the bag rack attached to the sweater rack. The golf clubs in the bags are much taller than the top of the cooler, restricting access to the cooler from the outside of the cart. It would also be difficult to unzip the zipper on the top of the cooler that is closest to the golf bags from either within or outside of the cart since the zipper and bags are in close proximity to each other. The access to the cooler would be further hindered if the cart had a rearwardly extending golf bag canopy rain cover that is very popular on golf carts. The canopy rain cover would extend over the cooler even when the rain cover is retracted to allow access to the golf clubs. Another disadvantage to this design is that the cooler is limited in size by the inside dimensions of the sweater rack. If one cooler is used for four to six players having several golf carts, there is not adequate space within the cooler to store enough beverages and sandwiches to provide for all of the players.

Another cooler design that has been patented in the United States is Design Patent No. 293,551. This design patent describes a design for a cooler that is to be sewn or otherwise permanently mounted to the side of a golf bag. As can be clearly determined by the figures in this patent, this cooler has a distinct shape and contour, and is not designed to be mounted on a golf cart.

Therefore, a portable, easily transportable golf cart cooler that can be mounted to a golf cart in an area that does not reduce the storage room of the cart and is easily secured onto the cart is desired.

BRIEF SUMMARY OF THE INVENTION

The present invention provides a golf cart cooler that is portable and easy to mount to the front of almost any golf car. The cooler provides additional storage space to the cart for storing beverages, snacks and other perishable items in a thermally insulated container. The cooler is made from a soft body construction making it easy to fold up, transport and store.

It is to be understood that both the preceding summary and the following detailed description are intended to be exemplary and explanatory and are intended to provide a further explanation of the invention claimed. The invention will best be understood by reference to the following detailed description read in conjunction with the accompanying drawings.

OBJECTS AND ADVANTAGES OF INVENTION

Accordingly, several objects and advantages of the present invention are:

(a) to provide a golf cart cooler that mounts to the front of a golf cart providing additional storage room for beverages and perishable foods;

(b) to provide a golf cart cooler that is robust and durable;

(c) to provide a golf cart cooler with plenty of storage capacity that does not take up existing space within the golf cart;

(d) to provide a golf cart cooler that can be quickly and easily mounted to the front of a golf cart;

(e) to provide a golf cart cooler that can be easily accessed from within or outside of the cart;

(f) to provide a golf cart cooler that is esthetically pleasing and is mounted in front of the cart where an advertisement can be displayed on the front, top and sides of the cooler; and (g) to provide a golf cart cooler that is made from a soft body construction making it easy to fold up, transport and store.

BRIEF DESCRIPTION OF SEVERAL VIEWS OF THE DRAWINGS

These and other advantages of the present invention will become more fully apparent as the following description is read in conjunction with the drawings, wherein.

DETAILED DESCRIPTION OF THE PREFERRED EMBODIMENTS

Figure 1:
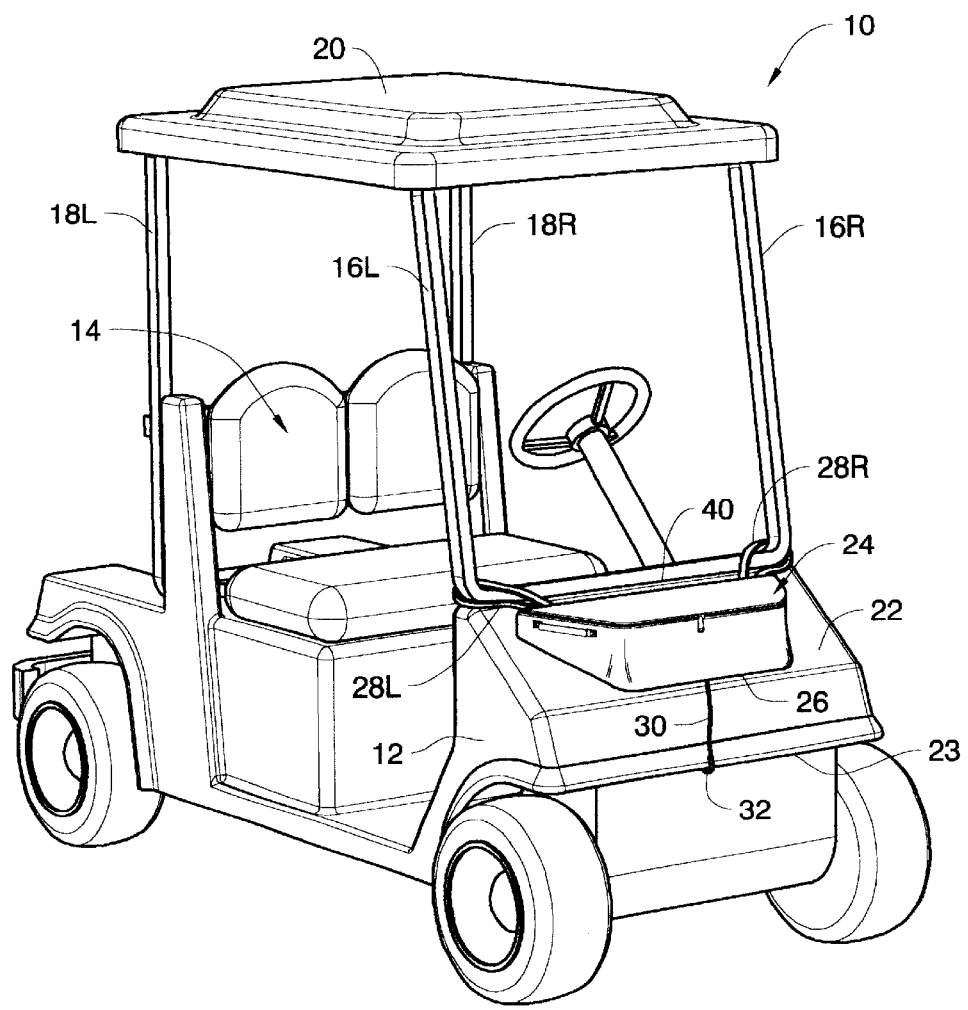
FIG. 1 is a front perspective view of a golf cart with a cart top in which the first embodiment of the present invention is mounted onto the front of the cart.

FIG. 1 shows a perspective view of a motorized golf cart 10 having a body 12, a passenger compartment 14, vertically extending and laterally spaced apart front right and left frame members 16R and 16L and rear right and left frame members 18R and 18L. The frame members support a cart top 20 shown in FIG. 1. The front right and left frame members can alternatively support a windshield 34 shown in FIG. 2 or both the windshield and the cart top.

Figure 3:
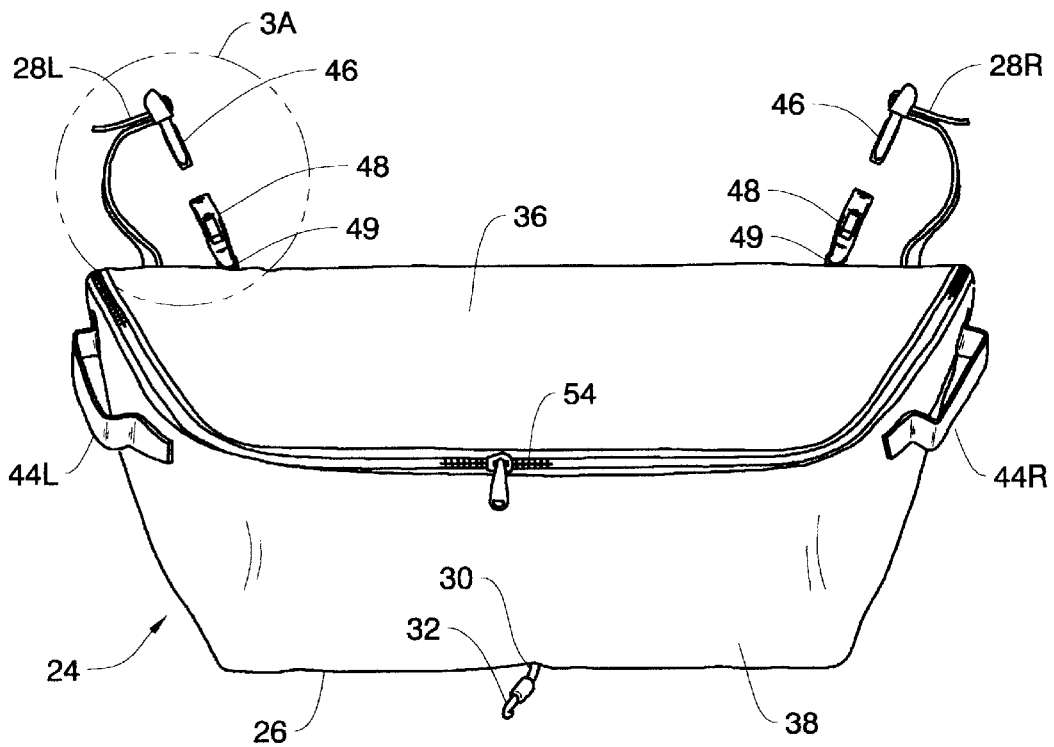
FIG. 3 is a front perspective view of the first embodiment of the present invention.
Figure 3A:
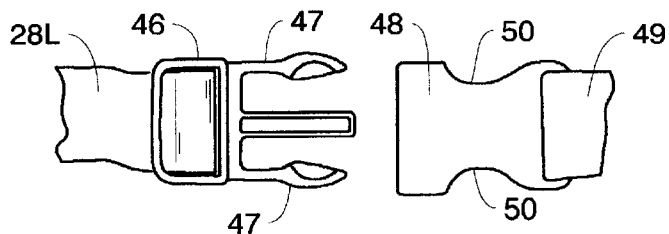
FIG. 3A is an enlarged view of the buckle members detached.

Body 12 of cart 10 has a slanted front face 22 on which a first embodiment of the present invention, a cooler 24, is shown resting in FIG. 1. The cooler is mounted to the cart by resting a bottom 26 of cooler 24 onto front face 22 of the cart. Bottom 26 is angled to approximately match the slant on front face 22 of cart 10. The cooler is mounted to the cart by surrounding right front frame member 16R with a right strap 28R and securing a male buckle member 46 that is sewn or otherwise attached onto the end of the right strap into a female buckle member 48, as shown in FIG. 3. A left strap 28L is secured around left front frame member 16L in the same way the right strap was secured. The right and left straps cooperate to support the cooler preventing it from sliding down the declining front face of the golf cart. Alternatively, the male and female buckle members on the straps could be replaced by hook and loop type fasteners, snaps, hooks or other fastening mechanisms. An elastic cord 30 with a hook 32 secured to the elastic cord's end is used to hook the bottom of the cooler to a lower face edge 23 of front face 22. The elastic cord 30 acts as a connecting member between the cooler and the lower face edge of the golf cart. The attachment of hook 32 onto lower front face edge 23 prevents the wind from raising bottom 26 off of the front face of the cart when the cart is traveling. The elastic cord is stretched to attach the hook on the end of the elastic cord over lower face edge 23 shown in FIG. 1. The stretched elastic cord has resultant tension within the cord that applies downward force on the bottom of the cooler keeping bottom 26 in contact with front face 22 on cart 10. It should be noted that a rubber or other elastic material could replace the elastic cord as the connecting member. Additionally, the elastic cord could be replaced by a strap or could be eliminated completely by using the weight of the contents within cooler 24 to hold the cooler down in position. The hook on the end of elastic cord 30 can be made out of tough plastic as for example nylon, however, a metal hook would also work.

Figure 3B:
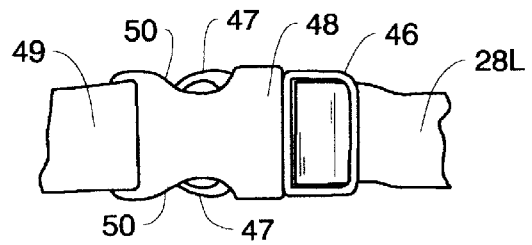
FIG. 3B is an enlarged view of the buckle members connected.
Figure 4:
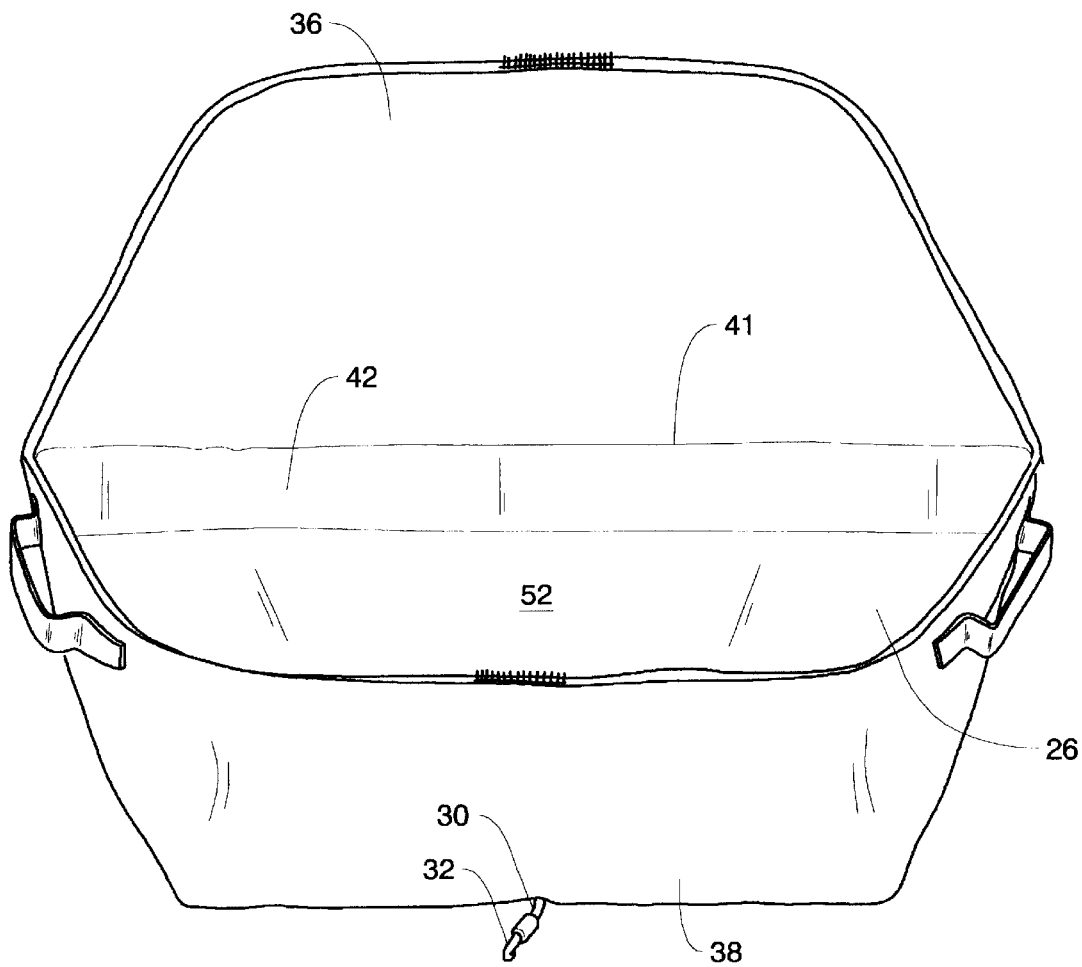
FIG. 4 is a front perspective view of the first embodiment of the present invention with the top open.

Turning now to a more detailed description of cooler 24, shown in FIGS. 3 and 4. Right strap 28R is sewn to the outer face of the right portion of a rear sidewall 42 and left strap 28L that is sewn to the outer face of the left portion of rear sidewall 42. On the ends of the right and left straps are male buckle members 46 that are designed to be detachable received by female buckle members 48 connected onto loops 49 that are sewn onto the outer face of the right and left hand portions of rear sidewall 42. The male and female buckle members can be made of a tough plastic, as for example nylon. Male buckles 46 have flexible latches 47 that engage the inside cavity of the female buckle members causing the latches to deflect toward each other as the male buckle member is inserted into the female buckle member. When the barbed ends of the latches reach slots 50 in the female buckle member, the latches snap outwardly away from each other through slots 50, as shown in FIG. 3B. This type of buckle and latch system is well known to those skilled in the art and will not be described further. The left and right straps and the loops can be constructed of polyester webbing material, however, cotton webbing material would also work. Alternatively, the right and left straps could be replaced by one longer strap that is capable of surrounding both the front right and left frame members. Additionally, a rope could replace the straps.

Figure 2:
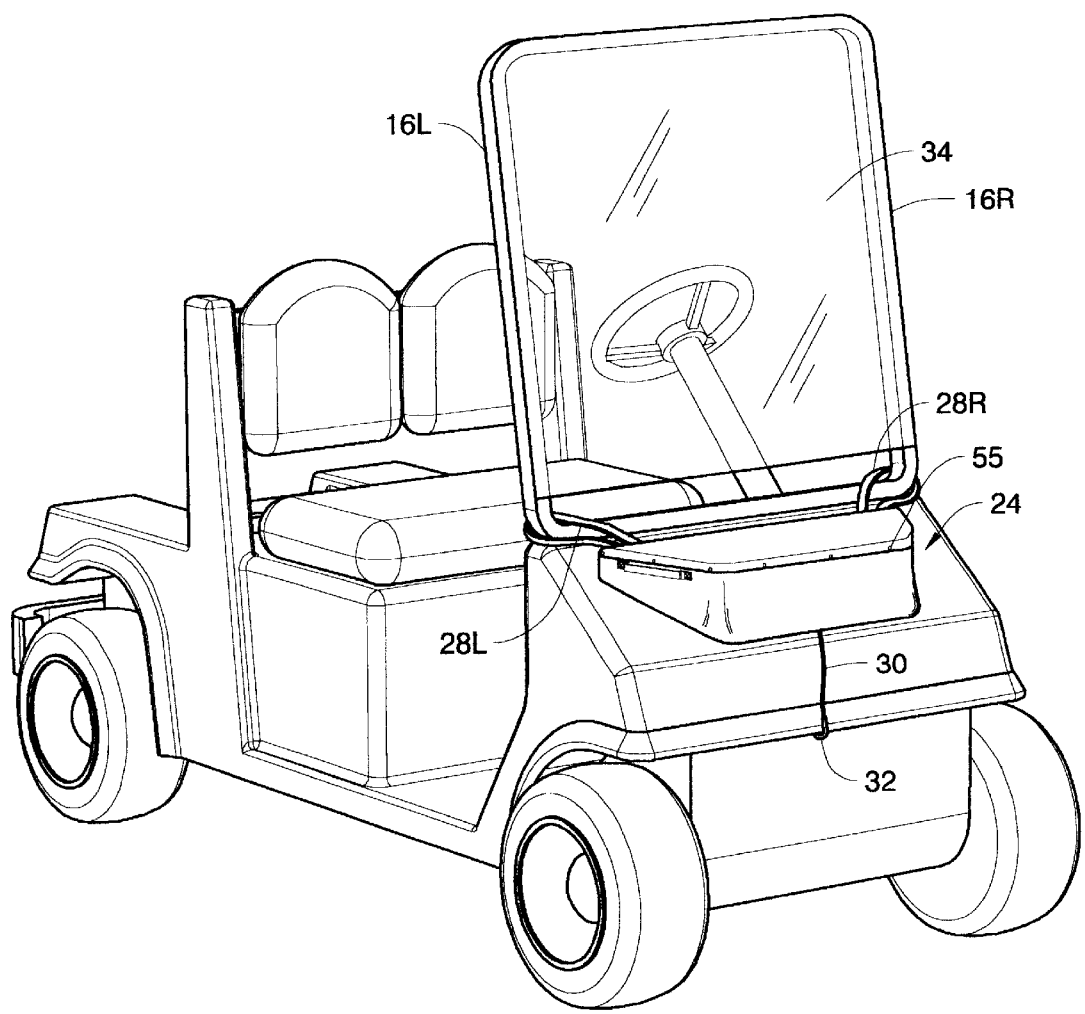
FIG. 2 is a front perspective view of the golf cart with a windshield in which an alternative first embodiment of the present invention is mounted onto the front of the cart.

A storage area 52 defined by a top 36, a sidewall 38, bottom 26 and rear sidewall 42, all being constructed of a flexible material made out of nylon, polyester, pack clothe, foam-backed foil or similar materials with thermally insulating properties. Alternatively, a combination of the mentioned materials may be attached together. The top, sidewall, bottom and rear sidewall can be additionally lined with a polymer material to further thermally insulate the walls and add to their wear resistance. Sidewall 38, bottom 26 and rear sidewall 42 are sewn together at corresponding edges, however, they could also be attached by gluing or using other connection methods like hook and loop strips, interlocking tongue and groove edges or buckled together. In this way, the sidewall, bottom, top and rear sidewall make up the flexible structural body of the cooler, as shown in FIGS. 3 and 4. Alternatively, two or more of these walls could be made from a single piece of material. For example, sidewall 38 and rear sidewall 42 could be made using the same continuous piece of material, reducing the amount of sewing required. The rear edge of top 36 is sewn onto the upper edge of rear sidewall 42 forming a seam 41, as can be seen in FIG. 4. Alternatively, the rear edge of top 36 could be glued, snapped or hook and loop fastened to the upper edge of rear sidewall 42. A right handle 44R is sewn onto the outer face of the right side portion of sidewall 38 and a left handle 44L is sewn onto the outer face of the left side portion of sidewall 38. It should be noted that the right and left handles could be sewn in different locations than indicated. Additionally, the handles may be attached using other attachment methods, as for example glue, rivets or plastic welding. Both the right and left handles can be made of tough vinyl or polyester webbing material. The handles are used for lifting the cooler and transporting it. A zipper 54 is sewn onto the upper edge of sidewall 38 and the top's corresponding edge. The zipper can be made from tough plastic, as for example nylon, however, metal zippers may be used as well. The zipper saves as a convenient fastener to secure the upper edge of the sidewall to the corresponding edge of the top. The zipper could be replaced by a hook and loop fastener, snaps 55, as shown in FIG. 2, or other fastening mechanisms.

Figure 5:
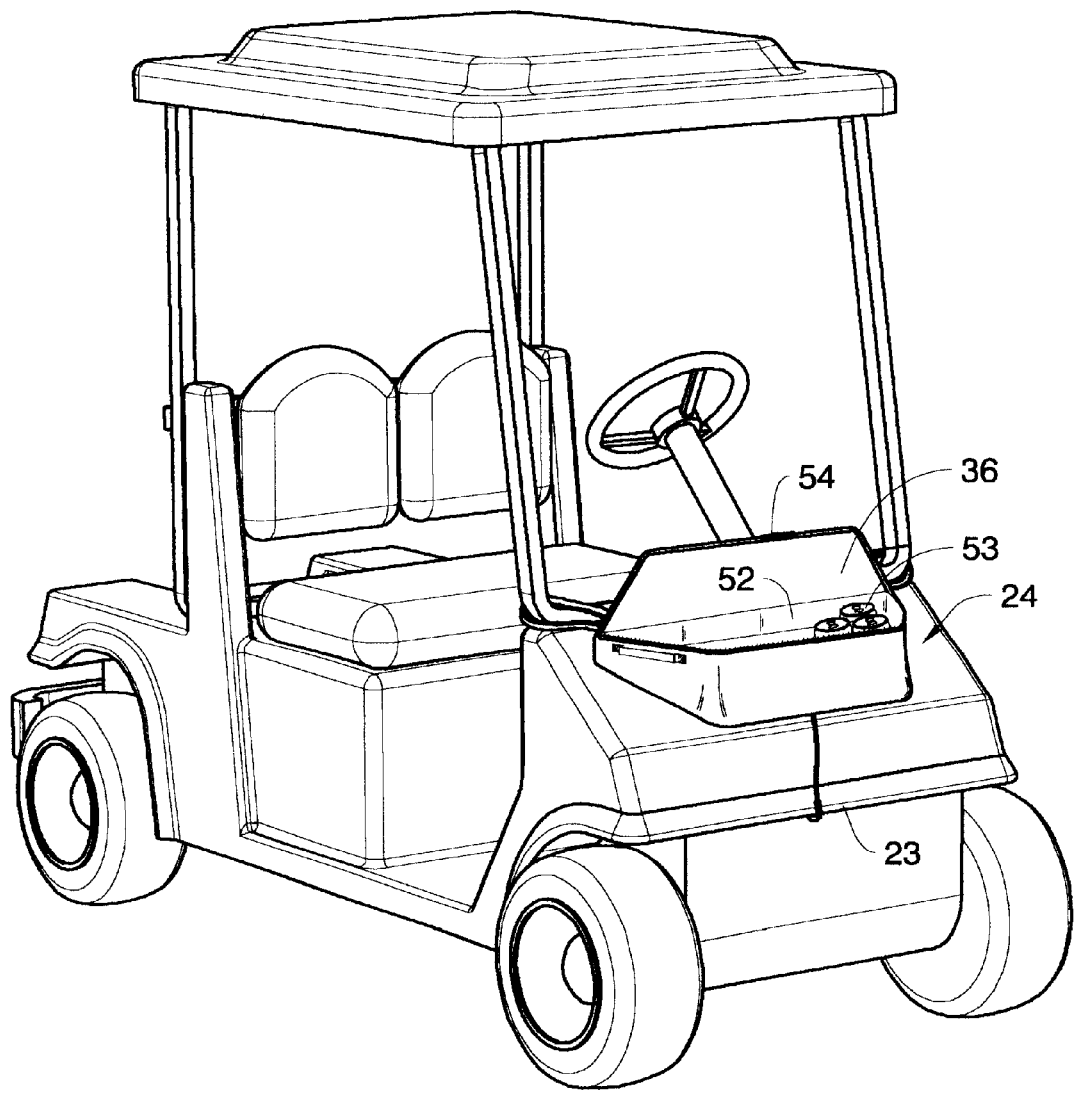
FIG. 5 is a front perspective view of the first embodiment of the present invention mounted onto a golf cart with the top open.

Referring now to FIG. 5, the cooler can be used to store items 53 within storage area 52 by unzipping zipper 54, lifting top 36 and placing the items within storage area 52. Items 53 stored within the storage area are supported by sidewall 38 and rest on bottom 26. Zipper 54 can be zipped closed to seal the upper edge of sidewall 38 to the corresponding edge of top 36. In this way, the items are secured within the storage area and cannot fall out of cooler 24. The stored items 53 are thermally insulated from the warmer outside ambient temperature.

Figure 6:
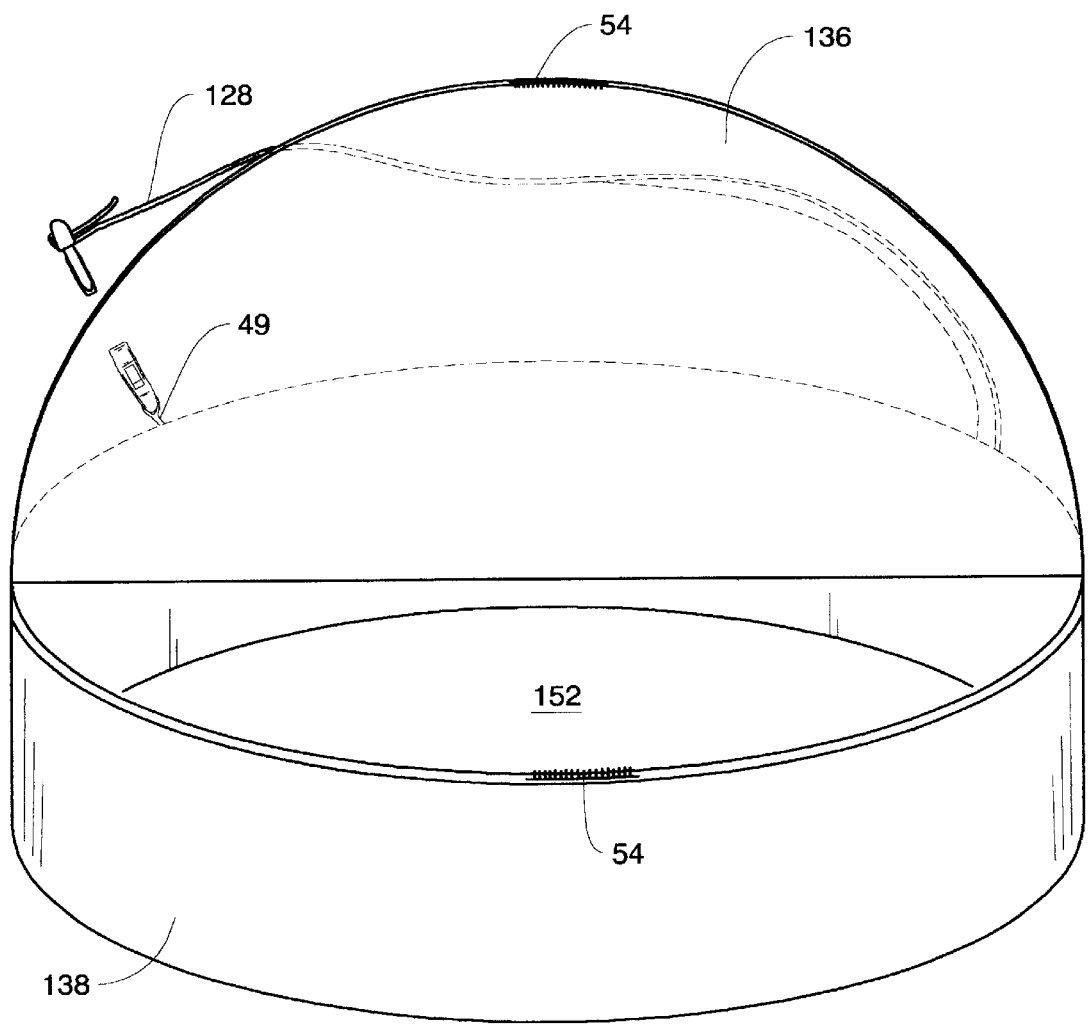
FIG. 6 is a front perspective view of the second embodiment of the present invention.

In a second embodiment of this invention, shown in FIG. 6, a modified storage area 152 has a substantially cylindrical shape. In this embodiment, a modified top 136 is round and a modified sidewall 138 is one continuous sheet of flexible insulating material made out of nylon, polyester, pack clothe, foam-backed foil or similar materials with thermally insulating properties. However, it could also be made of several pieces of material attached together. A modified strap 128 replaces the two smaller original right and left straps included in the first embodiment. However, it should be noted that two or more straps could be used for this second embodiment. Additionally, the right and left handles have been eliminated. Alternatively, the cooler of this embodiment could include one or more handles. The cooler could also have a number of other shapes, as for example oval, rectangular, etc.

Figure 7:
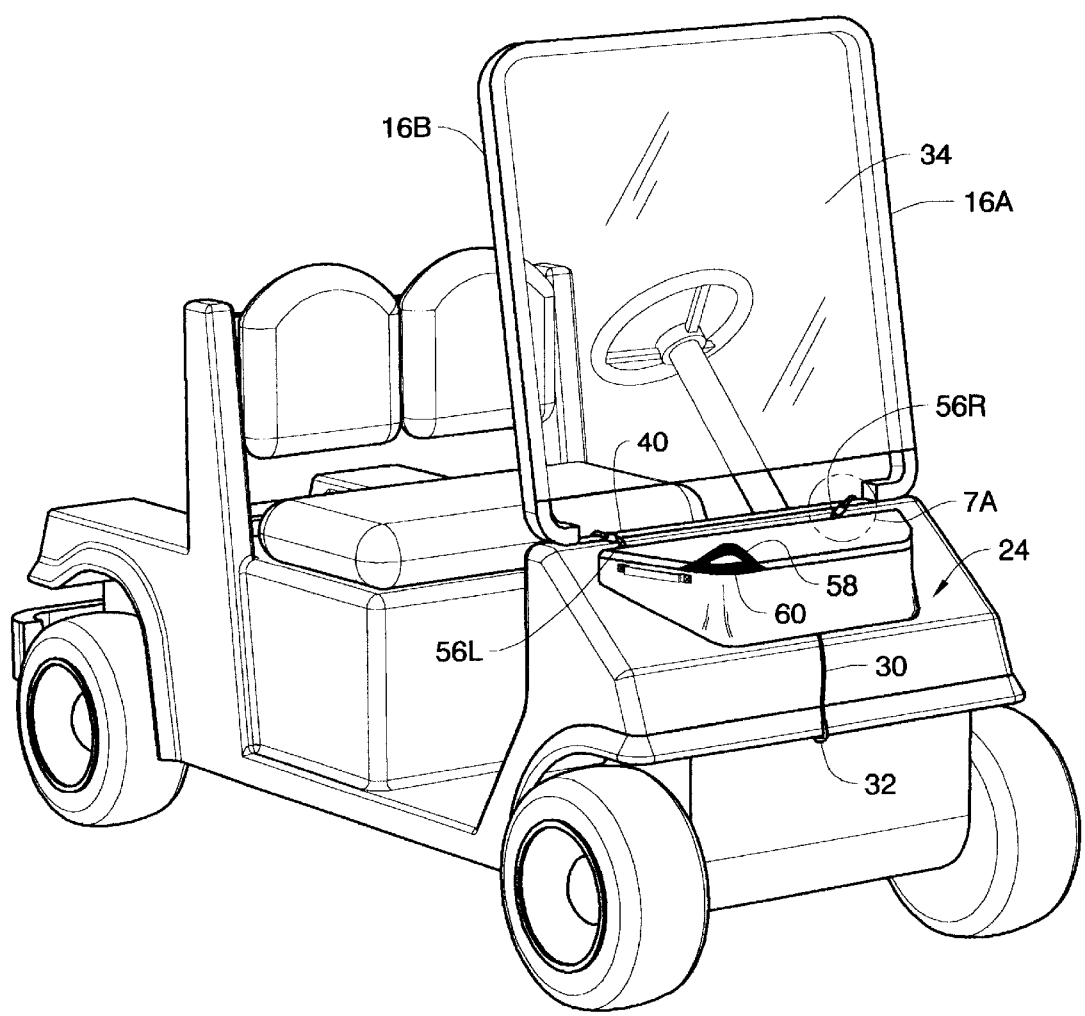
FIG. 7 is a front perspective view of the third embodiment of the present invention.
Figure 7A:
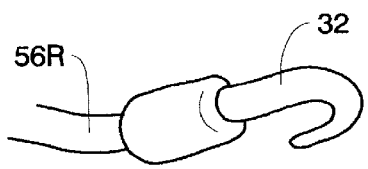
FIG. 7A is an enlarged view of the hook strap shown in the third embodiment.

In a third embodiment of this invention, shown in FIG. 7, the left and right straps have been replaced by a left hook strap 56L and a right hook strap 56R. Both the left and right hook straps have hooks 32 attached at their ends, as shown in FIG. 7A. The hooks are used to hook over an upper face edge 40 shown in FIG. 7. The cooler can be secured to front face 22 of golf cart 10 by first hooking hooks 32 on the ends of the hook straps over upper face edge 40, resting the cooler on front face 22 and then stretching elastic cord 30 to enable hook 32 on the end of the elastic cord to be hooked onto lower face edge 23. In this way, cooler 24 is retained on front face 22 by the left and right hook straps preventing the cooler from slipping down the declining front face and elastic cord 30 with hook 32 hooked to the lower face edge providing a downward force on cooler 24 preventing the hooks on the ends of the left and right hook straps from shaking loose while the golf cart is moving. The left and right hook straps can be made from polyester webbing material, cotton webbing material or from an elastic material. Alternatively, the left and right hook straps could be replaced by a single hook strap that was connected in the center of the cooler. Another feature of this embodiment is that zipper 54 has been replaced with a hook strip 58 and a loop strip 60. The hook and loop strips cooperate to form a fastening seal that secures the outer edge of top 36 to the corresponding edge of sidewall 38. Alternatively, the outer edge of top 36 could be secured to the corresponding edge of sidewall 38 using mechanically interlocking plastic.

Figure 8:
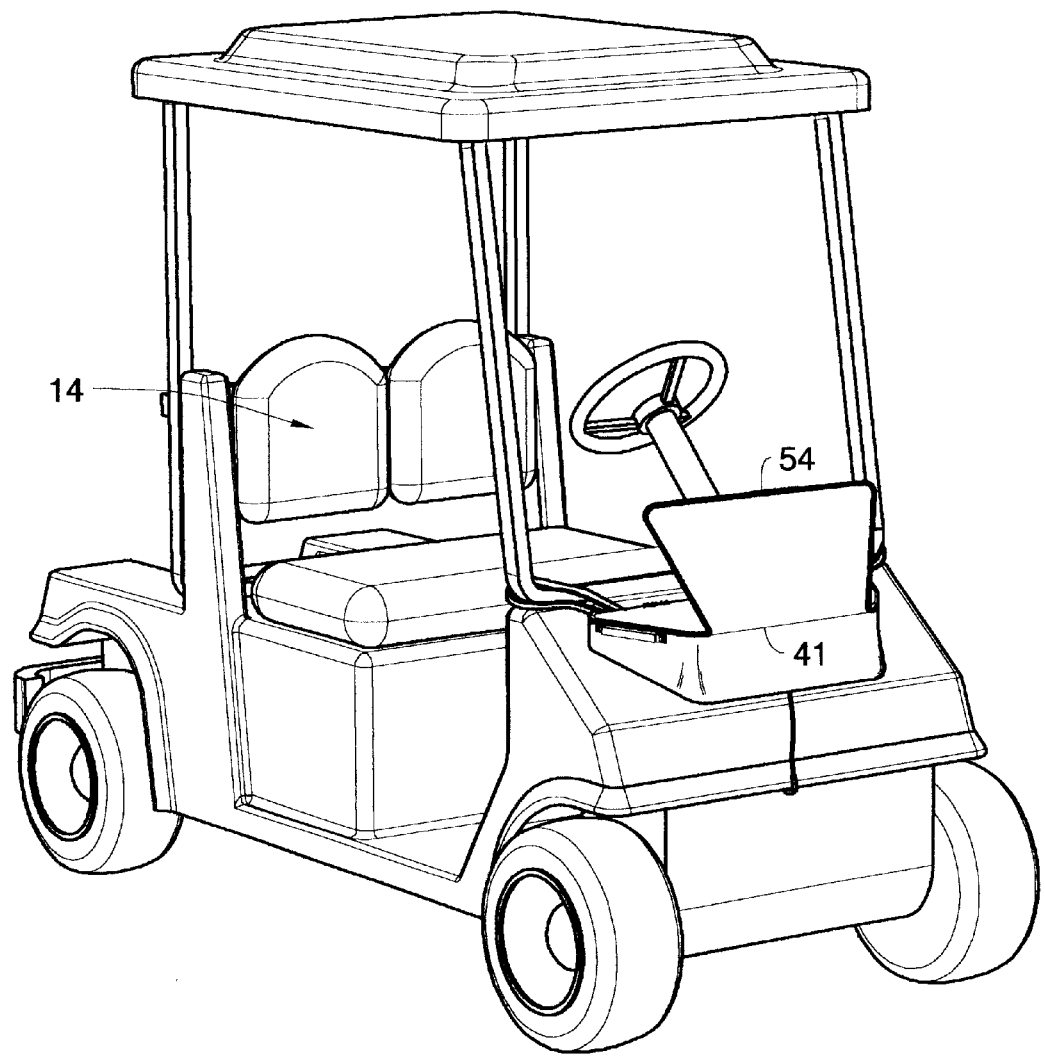
FIG. 8 is a front perspective view of the fourth embodiment of the present invention.

In a fourth embodiment of this invention, shown in FIG. 8, seam 41 has been moved from the rear edge of top 36 to the front edge of top 36. In this embodiment, storage area 52 opens toward passenger compartment 14. Zipper 54 allows for the fastening of the remaining outer edge of top 36 as shown in the figure. This embodiment facilitates easier access of the cooler from within the golf cart.

Figure 9:
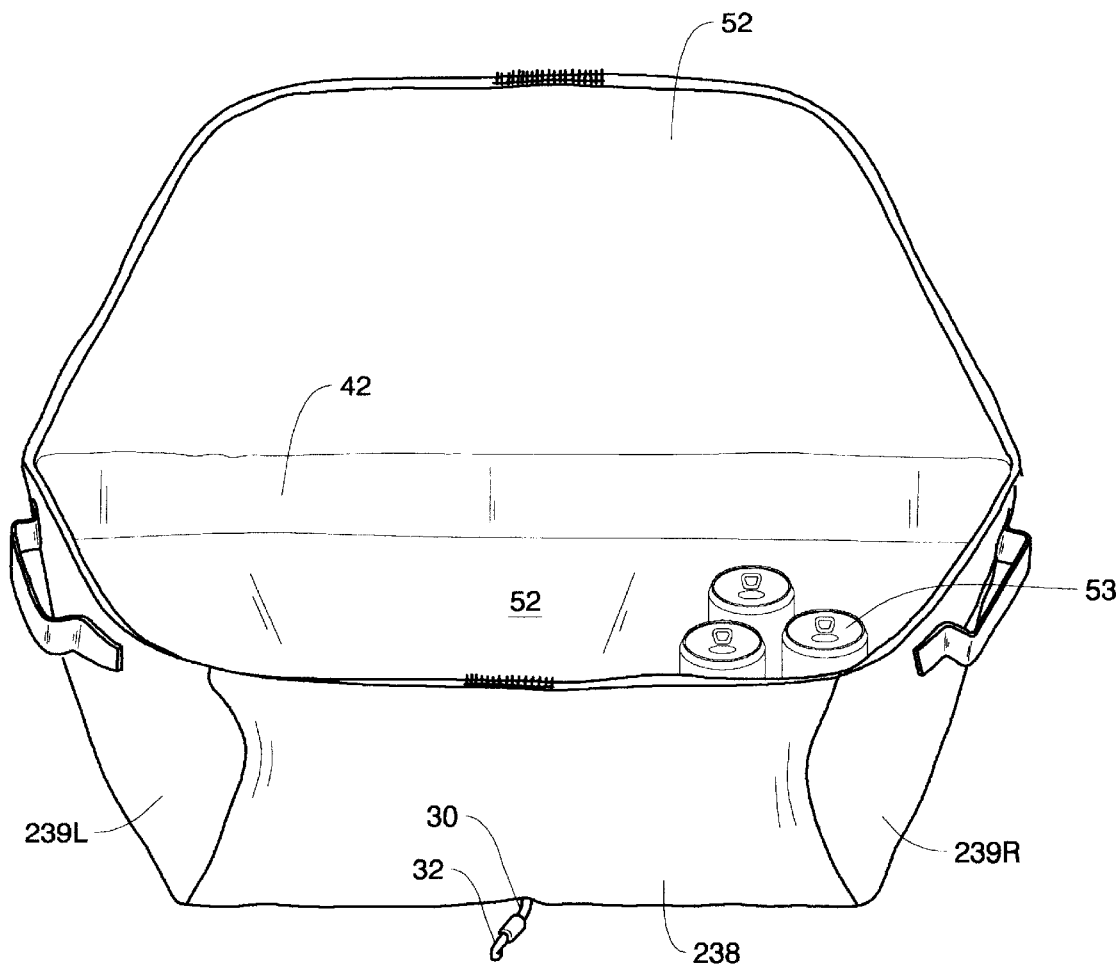
FIG. 9 is a front perspective view of the fifth embodiment of the present invention.

In a fifth embodiment of this invention, shown in FIG. 9, sidewall 38 has been replaced by a left sidewall 239L, a front sidewall 238 and a right sidewall 239R. The left, front and right sidewalls are sewn together at corresponding edges as shown. Alternatively, they could be glued, snapped or otherwise attached at each corresponding edge. This embodiment facilitates the use of different types of panel material for improved appearance. It also enables the use of small pieces of material attached together to cooperate to make up the entire wall.

Conclusions, Ramifications and Scope of Invention

Accordingly, one skilled in the art will recognize that the golf cart cooler of this invention can be used for storing beverages and other items within the cooler in a thermally insulated environment on the front of a golf cart. That it can be used easily and conveniently, installed just as easily without the need for tools, accessed from within or outside of the golf cart and is aesthetically pleasing when installed on the cart. Furthermore, this invention has the additional advantages in that;

(a) it provides a golf cart cooler that can be folded up and easily transported and stored;

(b) it provides a golf cart cooler that securely fits on the front end of a variety of golf carts;

(c) it provides a golf cart cooler that provides additional storage to the players on the cart that is not normally available, therefore, this invention increases the storage space of the cart; and (d) it provides a golf cart cooler that is robust and durable.

Although the description above contains many specificities, these should not be construed as limiting the scope of the invention, but as merely providing illustrations of some of the presently preferred embodiments of this invention. For example, the straps used to secure the cooler to the front frame members could be replaced by snaps, a hook and loop fastener, magnets or a magnetic strip sewn into the cooler; the cooler could be mounted onto the front of a golf cart cover by sewing, snapping, hook and loop fasteners or other attachment methods; the elastic cord could be replaced with a rubber, nylon or other elastic material; the elastic cord could be eliminated completely; the elastic cord could be replaced with a hook and loop fastener with one portion being fixed onto the cart body and the other being fixed onto the bottom of the cooler; the hook could be replaced with another attachment mechanism; the sidewall and the rear sidewall could be combined into one continuous wall; the sidewalls and the bottom could be combined into one continuous piece of material; the sidewalls, bottom and top could be combined into one continuous piece of material; the handles on the cooler could be eliminated or replaced by one large handle attached to the top or rear sidewall; the buckle members could be replaced by hook and loop fasteners, snaps or other fastening mechanisms; the zipper could be replaced with a series of snaps, a hook and loop fastener or a mechanically interlocking plastic, etc.

Thus the scope of the invention should be determined by the appended claims and their legal equivalents, rather than by the examples given.

What is claimed is:

1. A cooler that is attachable to the front of a motorized golf cart, the golf cart having a body including a front face having a lower face edge and a seating compartment, said cooler comprising:
   a top wall:
   a bottom wall;
   a front wall;
   a rear wall;
   at least two end walls;
   wherein said top, said bottom, said front, said rear and said end walls are made of flexible, thermally insulating material and are attached to each other at a plurality of corresponding edges;
   a connecting mechanism for detachably connecting at least one edge of said top wall to a corresponding edge of said sidewall;
   a mounting mechanism attached to said cooler for retaining said cooler onto the front face of the golf cart;
   an elastic cord having a first end and a second end, said first end is attached to said cooler and said second end is free; and
   a hook attached to said second end of said elastic cord, whereby said hook can be attached to the lower face edge of the front face of the motorized golf cart to hold said bottom wall of said cooler down onto the front of the golf cart.

2. A cooler according to claim 1 wherein said connecting mechanism is a zipper.

3. A cooler according to claim 1 wherein said connecting mechanism is a hook and loop fastener.

4. A cooler according to claim 1 wherein said connecting mechanism is a plurality of snap fasteners.

5. A cooler that is attachable to the front of a motorized golf cart, the golf cart having a body including a front face having a lower face edge, a frame including front spaced apart vertically extending frame members and a seating compartment, said cooler comprising;
   a top wall;
   a bottom wall;
   a sidewall;
   wherein said top wall, said bottom wall and said sidewall are made of flexible, thermally insulating material;
   means for attaching a plurality of the corresponding edges of said top wall, said bottom wall and said sidewall forming a container;
   a connecting mechanism for detachably connecting at least one edge of said top wall to a corresponding edge of said sidewall;
   at least one strap having a first end and a second end, said first end being attached to said cooler;
   means for releasably connecting the second end of said strap to form a loop around the front vertically extending frame members, whereby said strap is used to surround the vertically extending frame members to retain said cooler onto the front face of the cart;
   an elastic cord having a first end and a second end, said first end is attached to said cooler and said second end is free; and
   a hook attached to said second end of said elastic cord, whereby said hook can be attached to the lower face edge of the front face of the motorized golf cart to hold said bottom wall of said cooler down onto the front of the golf cart.

6. A cooler according claim 5 wherein said means for releasably connecting the second end of said strap to form a loop around the front vertically extending frame members comprises:
   a female buckle member attached to the outer surface of said sidewall; and
   a male buckle member attached to said second end of said strap, whereby said female and said male buckle members connect together forming a releasable connection.

7. A cooler according to claim 5 wherein said means for releasably connecting the second end of said strap to form a loop around the front vertically extending frame members comprises:
   a hook pad attached to said second end of said strap; and
   a loop pad attached to the outer surface of said sidewall.

8. A cooler according to claim 5 wherein said connecting mechanism is a zipper.

9. A cooler that is attachable to the front of a motorized golf cart, the golf cart having a body including a front face having a lower face edge and a scaling compartment, said cooler comprising;
   a top wall;
   a bottom wall;
   a sidewall;
   wherein said top wall, said bottom wall and said sidewall are made of flexible, thermally insulating material and are attached to each other at a plurality of corresponding edges;
   a zipper for detachably connecting at least one edge of said top wall to a corresponding edge of said sidewall;
   at least one strap having a first end and a second end, said first end is attached to said cooler, said second end is free;
   a hook attached to said strap on said second end, wherein said hook can be hooked over the top edge of the front face of the golf cart for demountably retaining said cooler onto the front face of the golf cart;
   an elastic cord having a first end and a second end, said first end is attached to said cooler and said second end is free; and
   a bottom hook attached to said second end of said elastic cord, whereby said bottom hook can be attached to the lower face edge of the front face of the motorized golf cart to hold said bottom wall of said cooler down onto the front of the golf cart.

10. A cooler that is attachable to the front of motorized golf cart, the golf cart having a body including a front face having an upper face edge and a lower face edge, a frame including front spaced apart right and left vertically extending frame members and a seating compartment, said cooler comprising:
    a top;
    a bottom;
    a sidewall,
    wherein said top, said bottom and said sidewall are made of flexible, thermally insulating material and are attached together at corresponding edges forming a container;
    a connecting mechanism for detachably connecting at least one edge of said top to a corresponding edge of said sidewall;

a first right strap having a first end and a second end, said first end being attached to the right half of said cooler;

a second right strap having a first end and a second end, said first end being attached to the right half of said cooler;

a first fastening mechanism for releasably connecting the second end of said first right strap to said second end of said second right strap to form a loop around the right front vertically extending frame member on the cart;

a first left strap having a first end and a second end, said first end being attached to the left half of said cooler;

a second left strap having a first end and a second end, said first end being attached to the left half of said cooler; and a second fastening mechanism for releasably connecting the second end of said first left strap to said second end of said second left strap to form a loop around the left front vertically extending frame member on the cart.

wherein said first and second right straps and said first and second left straps are used to retain said cooler onto the front face of the cart.

11. A cooler that is attachable to the front of a motorized golf cart, the golf cart having a body including a front face having a lower face edge and a seating compartment, said cooler comprising:

a top;

a bottom;

a sidewall, wherein said top, said bottom and said sidewall are made of flexible, thermally insulating material and are attached to each other at corresponding edges;

a connecting mechanism for detachably connecting at least one edge of said top to a corresponding edge of said sidewall;

a mounting mechanism attached to said cooler for retaining said cooler onto the front face of the golf cart;

a connecting mechanism having a first end and a second end, said first end is attached to said cooler and said second end is free; and a releasable fasten attached to said second end of said connecting member, wherein said releasable fastener can be attached to the lower face edge of the front face of the motorized golf cart to hold said bottom of said cooler down onto the front face of the golf cart.

12. A cooler according to claim 11 wherein said connecting member is a strap.

13. A cooler according to claim 11 wherein said connecting member is an elastic cord.

14. A cooler according to claim 11 wherein said releasable fastener is a hook.

15. A cooler that is attachable to the front of a motorized golf cart, the golf cart having a body including a front face having a lower face edge and a seating compartment, said cooler comprising:

a top;

a bottom;

a sidewall, wherein said top, said bottom and said sidewall are made of flexible, thermally insulating material and are attached to each other at corresponding edges;

a connecting mechanism for detachably connecting at least one edge of said top to a corresponding edge of said sidewall;

a mounting mechanism attached to said cooler for retaining said cooler onto the front face of the golf cart; and a connecting member having a first end and a second end, said first end is attached to said cooler and said second end is adapted to be releasably attached to the lower face edge of the front face of the motorized golf cart to hold said bottom of said cooler down onto the front face of the golf cart.

16. A cooler that is attachable to the front of a motorized golf cart, the golf cart having a body including a front face having an upper face edge and a lower face edge, a frame including front spaced apart vertically extending frame members and a seating compartment, said cooler comprising:

a top;

a bottom;

a sidewall, wherein said top, said bottom and said sidewall are made of flexible, thermally insulating material and are attached together at corresponding edges forming a container;

a connecting mechanism for detachably connecting at least one edge of said top to a corresponding edge of said sidewall;

a strap having a first end and a second end, said first end is secured to said cooler and said second end is free;

a hook attached to said strap at said second end, wherein said hook is adapted to allow attachment to the upper face edge of the front face of the golf cart;

a connecting member having a first end and a second end, said first end is attached to said cooler and said second end is free; and a releasable fastener attached to said second end of said connecting member, wherein said releasable fastener can be attached to the lower face edge of the front face of the motorized golf cart to hold said bottom of said cooler down onto the front face of the golf cart.

* * * * *

UNITED STATES PATENT AND TRADEMARK OFFICE
CERTIFICATE OF CORRECTION

PATENT NO.     : 6,601,745 B2
DATED          : August 5, 2003
INVENTOR(S)    : Stephen Edward Tyrer It is certified that error appears in the above-identified patent and that said Letters Patent is hereby corrected as shown below:

Column 5,
Line 15, delete "saves" and replace with -- serves --.

Column 8,
Line 25, delete "scaling" and replace with -- seating --.

Column 9,
Line 40, delete "mechanism" and replace with -- member --;
Line 43, delete "fasten" and replace with -- fastener --.

Signed and Sealed this

Twenty-second Day of June, 2004

JON W. DUDAS
*Acting Director of the United States Patent and Trademark Office*